United States Patent
Cho et al.

(10) Patent No.: US 11,996,890 B2
(45) Date of Patent: May 28, 2024

(54) RoF-BASED DISTRIBUTED ANTENNA SYSTEM

(71) Applicant: ELECTRONICS AND TELECOMMUNICATIONS RESEARCH INSTITUTE, Daejeon (KR)

(72) Inventors: Seung-Hyun Cho, Sejong-si (KR); Joon Ki Lee, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 65 days.

(21) Appl. No.: 17/845,190

(22) Filed: Jun. 21, 2022

(65) Prior Publication Data

US 2022/0416894 A1    Dec. 29, 2022

(30) Foreign Application Priority Data

Jun. 24, 2021 (KR) .................. 10-2021-0082568
Dec. 9, 2021 (KR) .................. 10-2021-0176003

(51) Int. Cl.
*H04B 10/2575* (2013.01)
*H04L 7/04* (2006.01)
*H04W 88/08* (2009.01)

(52) U.S. Cl.
CPC ......... *H04B 10/25753* (2013.01); *H04L 7/04* (2013.01); *H04W 88/085* (2013.01)

(58) Field of Classification Search
None
See application file for complete search history.

(56) References Cited

U.S. PATENT DOCUMENTS

| | | | |
|---|---|---|---|
| 5,920,410 A * | 7/1999 | Smith ............... | H04Q 11/0062 398/4 |
| 9,712,298 B2 | 7/2017 | Ko et al. | |
| 10,601,378 B2 | 3/2020 | Stewart et al. | |
| 2008/0232804 A1* | 9/2008 | Absillis ............... | H04J 3/14 398/71 |
| 2014/0355991 A1* | 12/2014 | Cameirao .......... | H04B 10/2575 398/79 |
| 2016/0142196 A1 | 5/2016 | Saban et al. | |
| 2016/0352397 A1 | 12/2016 | Faccin et al. | |
| 2017/0111090 A1 | 4/2017 | Nam et al. | |

OTHER PUBLICATIONS

"Radio over fibre systems", ITU-T G.9803(Nov. 2018).
"Fibre optic active components and devices—Performance standards—Part 10: Radio-over-fibre (RoF) transceivers for mobile fronthaul", IEC 62149-10, Edition 1.0, Nov. 2018.

(Continued)

*Primary Examiner* — Darren E Wolf
(74) *Attorney, Agent, or Firm* — LRK PATENT LAW FIRM (57) ABSTRACT

Provided is a radio over fiber (RoF)-based distributed antenna system (DAS) structure that cost-effectively provides a fifth generation (5G) mobile communication service guaranteeing a quality of service (QoS) with high bandwidth and low latency characteristics without radio shadowing in an indoor environment.

8 Claims, 4 Drawing Sheets

(56) References Cited

OTHER PUBLICATIONS

Seung-Hyun Cho, "Transmitting Equipment for Radiocommunication—Radio-over-Fibre Technologies and Their Performance Standard—Part 4: Radio-over-fibre based inddor DAS (distributed antenna system) for 5G", IEC 63098-4, Edition 1.0, Jun. 2020.
Hiroyo Ogawa, "Transmitting Equipment for Radiocommunication—Radio-over-Fibre Technologies and Their Performance Standard—Part 4: Radio-over-fibre based indoor DAS (distributed antenna system) for 5G", IEC 63098-4, Edition 1.0, Oct. 2020.

* cited by examiner

RoF-BASED DISTRIBUTED ANTENNA SYSTEM

CROSS-REFERENCE TO RELATED APPLICATIONS

This application claims the benefit of Korean Patent Application No. 10-2021-0082568 filed on Jun. 24, 2021, and Korean Patent Application No. 10-2021-0176003 filed on Dec. 9, 2021, in the Korean Intellectual Property Office, the entire disclosures of which are incorporated herein by reference for all purposes.

BACKGROUND

1. Field of the Invention

One or more example embodiments relate to a radio over fiber (RoF)-based distributed antenna system (DAS).

2. Description of Related Art

The increasing application of an indoor distributed antenna system (DAS) to a fifth-generation (5G) system has increased the need for a method of configuring such an indoor DAS.

SUMMARY

The example embodiments provide a system providing a radio over fiber (RoF)-based 5G indoor distributed antenna system (DAS) network to cost-effectively provide quality of service (QoS)-guaranteed 5G mobile communication services with high bandwidth and low latency characteristics without wireless shadowing in an indoor environments.

According to an example embodiment, there is provided a DAS including a base station, a main hub unit, a remote antenna unit, and a distribution point connecting the main hub unit to the remote antenna unit, and the main hub unit and the remote antenna unit are configured to transmit and receive signals according to an electrical interface and an optical interface.

The main hub unit may relay a mobile signal from the base station to the remote antenna unit.

The remote antenna unit may transmit a wireless signal to a plurality of subscription components, capture a fifth generation (5G) signal of a user terminal, and transmit the captured signal to the main hub unit.

The DAS may have a point-to-point structure when the main hub unit and a single remote antenna unit are not connected through the distribution point and may have a point-to-multipoint structure when the main hub unit and multiple remote antenna units are connected through the distribution point.

The electrical interface of the main hub unit may include (i) an electrical interface for 5G signals in an intermediate frequency (IF) band, which is an electrical input/output interface that receives an analog IF-based downlink 5G signal from a 5G base station and transmits an analog IF-based uplink 5G signal from a remote antenna unit to the 5G base station; (ii) an electrical interface for frequency synchronization signals, receiving a frequency synchronization signal (or propagating the signal toward a remote antenna unit) from a 5G base station or a global positioning system (GPS) clock receiver; (iii) an electrical interface for time-division duplexing (TDD) synchronization signals, receiving a TDD signal (or propagating the signal toward a remote antenna unit) from a 5G base station; (iv) an electrical interface for system control and management signals, which is an electrical input/output interface for control and management signals used to monitor, manage, and control a main hub unit and (multiple) remote antenna units connected to the main hub unit.

The electrical interface of the remote antenna unit may include (i) an electrical interface for 5G signals in a radio frequency (RF) or millimeter wave (mmWave) band, which is an electrical input/output interface of a remote antenna unit for transmitting a 5G TDD synchronization signal in the RF or mmWave band through an antenna to a subscriber terminal or transmit the signal in a reverse direction; (ii) an electrical interface for system control and management signals, which is an electrical input/output interface for control and management signals used to monitor, manage, and control a remote antenna unit.

The optical interface of the main hub unit may include an optical interface for transmitting an analog IF-based data signal and a digital-based auxiliary signal, which is an optical interface that connects a frequency synchronization signal digitalized through digital sampling, a TDD signal, and a DAS control and management signal.

The optical interface of the remote antenna unit may include an optical interface for the reception an analog IF-based data signal and a digital-based auxiliary signal, which is an optical interface that connects a frequency synchronization signal digitalized through digital sampling, a TDD signal, and a DAS control and management signal.

According to an example embodiment, there is provided a test device for a DAS authenticates the stability of a laser for the DAS at a limited temperature, the DAS includes a base station, a main hub unit, a remote antenna unit, and a distribution point connecting the main hub unit to the remote antenna unit, and the main hub unit and the remote antenna unit may transmit and receive signals according to an electrical interface and an optical interface.

The main hub unit may relay a mobile signal from the base station to the remote antenna unit.

The remote antenna unit may transmit a wireless signal to a plurality of subscription components, capture a fifth generation (5G) signal of a user terminal, and transmit the captured signal to the main hub unit.

The DAS may have a point-to-point structure when the main hub unit and a single remote antenna unit are not connected through a distribution point and may have a point-to-multipoint structure when the main hub unit and multiple remote antenna units are connected through a distribution point.

The electrical interface of the main hub unit may include (i) an electrical interface for 5G signals in an intermediate frequency (IF) band, which is an electrical input/output interface that receives an analog IF-based downlink 5G signal from a 5G base station and transmits an analog IF-based uplink 5G signal from a remote antenna unit to the 5G base station; (ii) an electrical interface for frequency synchronization signals, receiving a frequency synchronization signal (or propagating the signal toward a remote antenna unit) from a 5G base station or a GPS clock receiver; (iii) an electrical interface for TDD synchronization signals, receiving a TDD signal (or propagating the signal toward a remote antenna unit) from a 5G base station; (iv) an electrical interface for system control and management signals, which is an electrical input/output interface for control and management signals used to monitor, manage, and control a main hub unit and (multiple) remote antenna units connected to the main hub unit.

The electrical interface of the remote antenna unit may include (i) an electrical interface for 5G signals in a radio frequency (RF) or millimeter wave (mmWave) band, which is an electrical input/output interface of a remote antenna unit for transmitting a 5G TDD synchronization signal in the RF or mmWave band through an antenna to a subscriber terminal or transmit the signal in a reverse direction; (ii) an electrical interface for system control and management signals, which is an electrical input/output interface for control and management signals used to monitor, manage, and control a remote antenna unit.

The optical interface of the main hub unit may include an optical interface for the transmission an analog IF-based data signal and a digital-based auxiliary signal, which is an optical interface that connects a frequency synchronization signal digitalized through digital sampling, a TDD signal, and a DAS control and management signal.

The optical interface of the remote antenna unit may include an optical interface for the reception an analog IF-based data signal and a digital-based auxiliary signal, which is an optical interface that connects a frequency synchronization signal digitalized through digital sampling, a TDD signal, and a DAS control and management signal.

According to example embodiments, an RoF-based 5G indoor DAS network may cost-effectively provide QoS-guaranteed 5G mobile communication services with high bandwidth and low latency characteristics without wireless shadowing in indoor environments.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, examples are described in detail with reference to the accompanying drawings. Like reference numerals in the drawings denote like elements, and a known function or configuration will be omitted herein.

Various modifications may be made to the example embodiments. Here, the example embodiments are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

The terminology used herein is for the purpose of describing particular example embodiments only and is not to be limiting of the example embodiments. As used herein, the singular forms "a," "an," and "the" are intended to include the plural forms as well, unless the context clearly indicates otherwise. As used herein, the term "and/or" includes any one and any combination of any two or more of the associated listed items It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

In addition, when describing the example embodiments with reference to the accompanying drawings, like components are assigned to like reference numerals regardless of the drawing numerals, and a repeated description related thereto will be omitted. In describing the example embodiments, when it is determined that a detailed description of the related technology may unnecessarily obscure the gist of the example embodiments, the detailed description will be omitted.

Hereinafter, the example embodiments will be described in detail with reference to the accompanying drawings.

Figure 1:
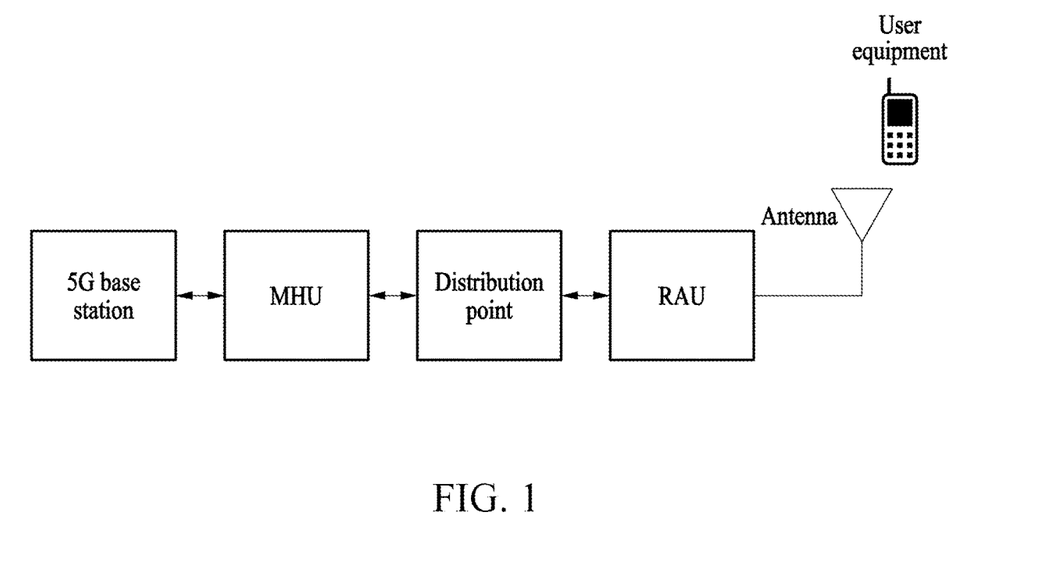
FIG. 1 is a diagram illustrating a structure of a distributed antenna system (DAS) for fifth generation (5G) according to an example embodiment.

FIG. 1 is a diagram illustrating an example of a structure of a distributed antenna system (DAS) for fifth generation (5G) according to an example embodiment.

Terminologies used herein are as follows.

(i) Radio over fiber (RoF)

A wireless signal transmission method using an optical fiber in which a signal is modulated by a wireless signal (ii) Distributed antenna system (DAS)

A network of an antenna node connected to a common source but spatially separated through a transmission medium that provides wireless services in a geographic area or structure (iii) Main hub unit (MEW)

An element connecting remote antenna units spatially distributed from a 5G base station (iv) Remote antenna unit (RAU)

An element connecting a main hub unit to a mobile terminal of a subscriber (v) Distribution point Dividing a downstream signal from a main hub unit to a remote antenna unit or combining an upstream signal from the remote antenna unit to the main hub unit in a DAS including an optical splitter or wavelength-division multiplexer/inverse-multiplexer.

Abbreviations used herein are shown in Table 1.

TABLE 1

| Acronyms and symbols | |
|---|---|
| ACLR | Adjacent channel leakage ratio |
| CWDM | Coarse wavelength division multiplexing |
| E/O | Electrical to optical |
| FA | Frequency allocation |
| FS | Frequency synchronization |
| IF | Intermediate frequency |
| MIMO | Multi input multi output |

TABLE 1-continued

Acronyms and symbols

| | |
|---|---|
| mmWave | Millimeter wave |
| O/E | Optical to electrical |
| O/E/O | Optical to electrical to optical |
| RF | Radio frequency |
| SISO | single input single output |
| TDD | Time division duplexing |
| VSWR | Voltage standing wave ratio |

A shadow area of a wireless signal may need to be removed indoors or in a certain environment. In particular, a millimeter wave (mmWave)-based 5G mobile communication system may have a wider bandwidth and low latency, and a DAS may need to be used to provide a 5G service smoothly indoors due to outdoor-to-indoor (O2I) high-frequency electromagnetic characteristics.

There may be an O2I penetration loss, strong straightness, or the like, and a bandwidth of a baseband signal received by a 5G system may be up to 100 megahertz (MHz)/FA. Also, maximal 8FA simultaneous transmission may be generally required. In addition, using a multiple input, multiple output (MIMO) configuration may require a bandwidth-efficient transmission technique because the DAS processes multiple gigahertz (GHz) bandwidth mobile signals.

RoF transmission may be one of the most effective candidates in terms of bandwidth utilization. Above all, there may be no redundant traffic occurring by a digital-to-analog (D/A) or analog-to-digital (A/D) conversion, as well as digital framing permanently required for traditional digital transmission. Therefore, the RoF-based DAS is considered a solution for implementing an mmWave-based 5G indoor network.

FIG. 1 illustrates a basic structure of a DAS for a 5G network. An MHU may relay a mobile signal from a 5G base station to an RAU. The RAU may transmit a 5G wireless signal to a plurality of subscriber's devices, capture a 5G signal of a user device, and transmit the captured signal to the MHU. In FIG. 1, an RoF link may build a connection between the MHU and the RAU.

Figure 2:
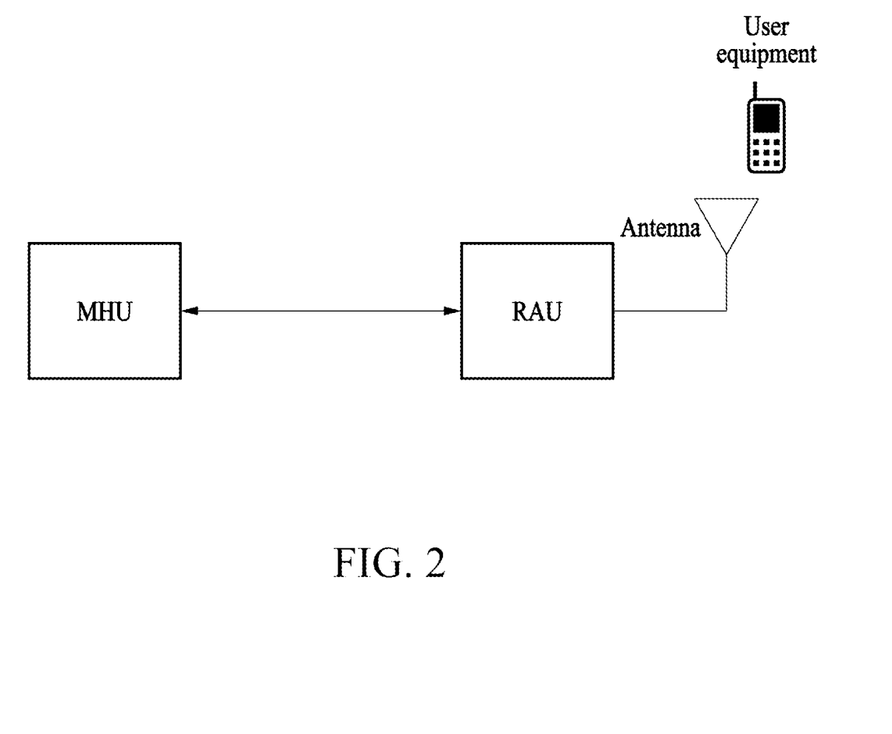
FIG. 2 is a diagram illustrating a point-to-point DAS structure according to an example embodiment.

FIG. 2 is a diagram illustrating a point-to-point DAS structure according to an example embodiment.

A 5G DAS may include various elements in point-to-point or point-to-multipoint configurations. According to an example embodiment, a system configuration may be a standard from a general perspective for efficient provision of 5G services in addition to cost-effective network construction and operation.

A point-to-point configuration illustrated in FIG. 2 may be applied to a direct connection of a single RAU to a single MHU without a distribution point. For example, when a 5G service is provided in a narrow area, this configuration may be more frequently employed as an initial step for providing the 5G service.

Figure 3:
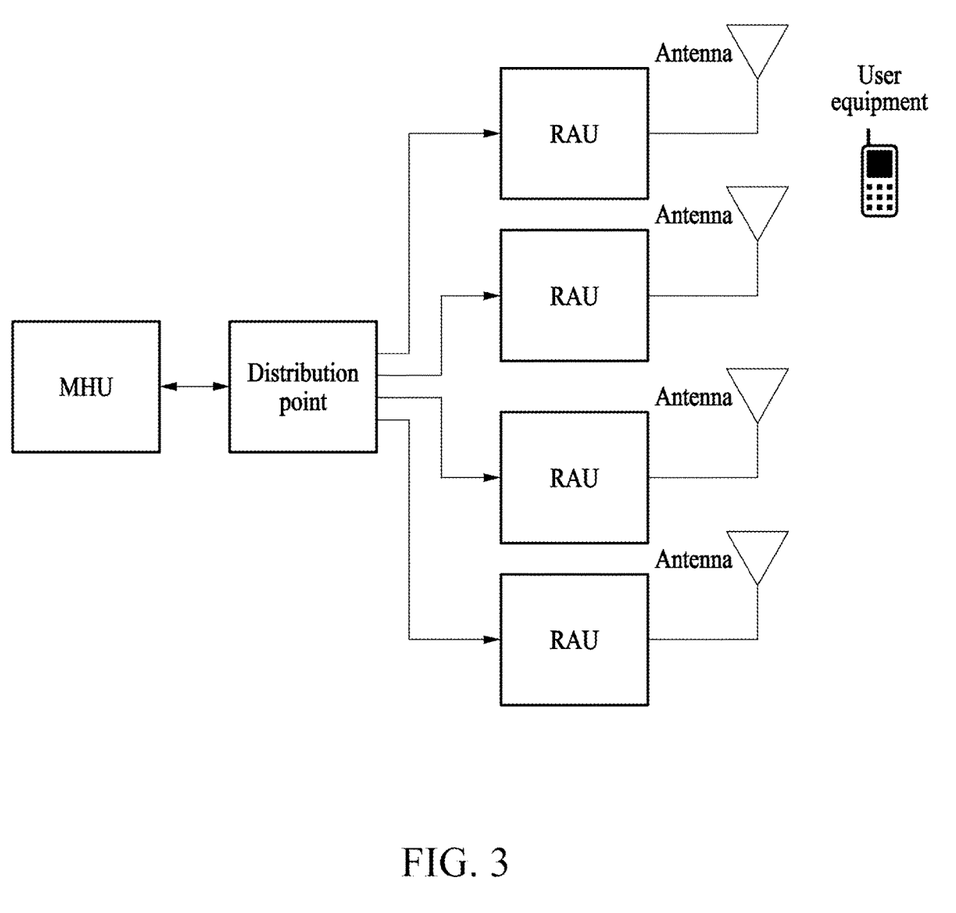
FIG. 3 is a diagram illustrating a point-to-multipoint DAS structure according to an example embodiment.

FIG. 3 is a diagram illustrating a point-to-multipoint DAS structure according to the example embodiments.

A point-to-multipoint configuration illustrated in FIG. 3 may be applied to a connection of multiple RAUs to a single MHU through a distribution point. Distribution may be performed to provide uninterrupted network coverage over a wide geometrical area.

Figure 4:
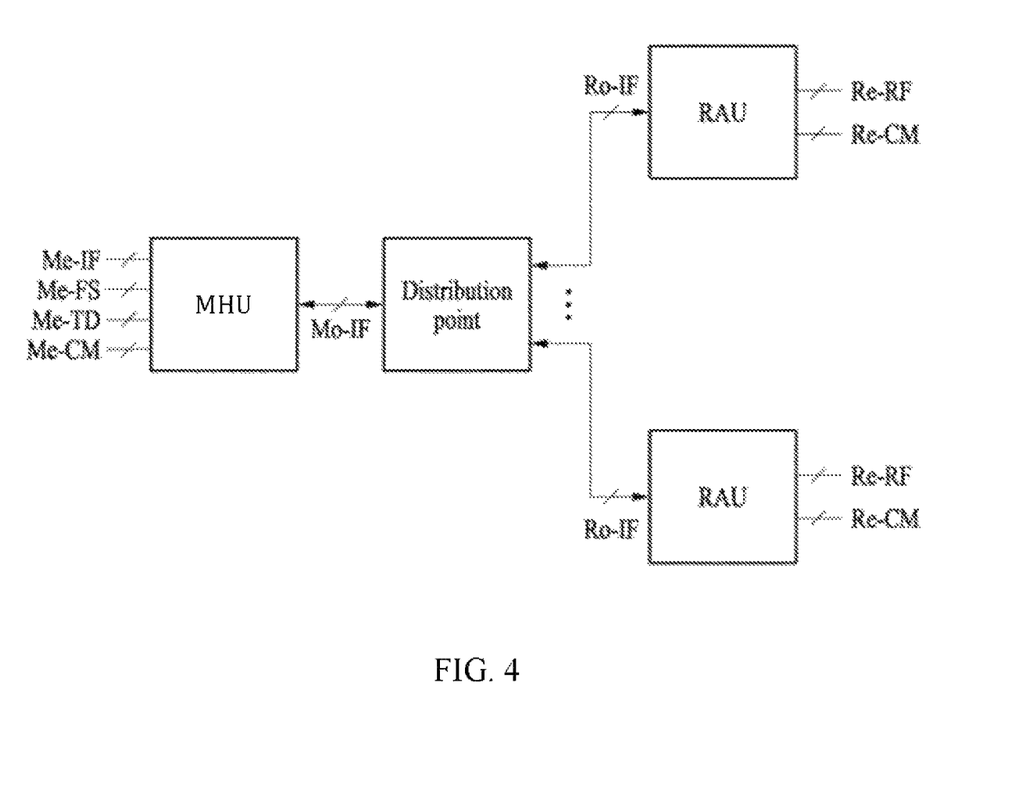
FIG. 4 is a diagram illustrating a system interface of a DAS structure for 5G according to an example embodiment.

FIG. 4 is a diagram illustrating a system interface of a DAS structure for 5G according to an example embodiment.

A DAS may include an electrical and optical interface. For example, an MHU and an RAU may include an electrical and optical interface for transmitting a 5G signal, a frequency synchronization signal, a time-division duplexing (TDD) signal, and a control/management (CM) signal.

(1) Electrical Interfaces

<MHU>

Electrical interfaces of an MHU may be indicated by Me-IF, Me-FS, Me-TD, and Me-CM as shown in FIG. 4. All the electrical interfaces of the MHU may be basically connected to a 5G base station.

Table 2 describes the definitions and functions of the electrical interfaces of the MHU.

TABLE 2

| Interface | Definitions | Functions |
|---|---|---|
| Me-IF | Electrical interface for 5G signal at IF-band | Electrical input/output interface that receives an analog intermediate frequency (IF)-based downlink 5G signal from a 5G base station and transmits an analog IF-based uplink 5G signal from an RAU to the 5G base station. |
| Me-FS | Electrical interface for frequency synchronization signal | Electrical interface that receives a frequency synchronization signal (or propagating the signal toward an RAU) from a 5G base station or a global positioning system (GPS) clock receiver |
| Me-TD | Electrical interface for TDD synchronization signal | Electrical interface that receives a TDD signal (or propagating the signal toward an RAU) from a 5G base station |
| Me-CM | Electrical interface for system control and management (CM) signal | Electrical input/output interface for CM signals used to monitor, manage, and control an MHU and an (multiple)RAU connected to the MHU |

<RAU>

Electrical interfaces of an RAU may be indicated by Re-RF and Re-CM in FIG. 4 and be electrically connected to an mmWave antenna operating in a 28 GHz band. Table 3 describes the definitions and functions of the electrical interfaces of the RAU.

TABLE 3

| Interface | Definitions | Functions |
|---|---|---|
| Re-RF | Electrical interface for 5G signal at RF (mm Wave) band | Electrical input/output interface of an RAU for transmitting a 5G TDD synchronization signal in an (RF) millimeter wave (mmWave) band, etc., through an antenna to terminal equipment of a subscriber or vice versa. |
| Re-CM | Electrical interface for system control and management (CM) signal | Electrical input/output interface for CM signals used to monitor, manage, and control an RAU |

(2) Optical Interface

<MHU>

An optical interface of an MHU may be indicated by Mo-IF in FIG. 4 and be optically connected to a single RAU or multiple RAUs through a distribution point. The optical interface may be defined as an optical interface between a downlink transmission signal transmitted from an MHU to an RAU in a DAS for 5G and an uplink reception signal transmitted from the RAU to the MHU. Table 4 describes the definitions and functions of the optical interface of the MHU. An analog IF-based data signal and a digital-based auxiliary signal may be multiplexed or demultiplexed using coarse wavelength-division multiplexing (CWDM) and connected to multiple RAUs.

TABLE 4

| Interface | Definitions | Functions |
|---|---|---|
| Mo-IF | Optical interface for transmission of analog IF-based data signals and digital-based auxiliary signals | Optical interface transmitting an analog IF-based data signal (downlink signal) transmitted from a 5G base station receives an analog IF signal(uplink signal) transmitted from an RAU. Optical interface that connects a frequency synchronization signal digitalized through digital sampling, a TDD signal, and a DAS control and management signal |

<RAU>

An optical interface of an RAU may be indicated by Ro-IF in FIG. 4 and be optically connected to the MHU through a distribution point. It is defined as the optical interface between an uplink transmission signal transmitted from the RAU to the MHU and a downlink transmission signal transmitted from the MHU. Table 5 describes the definitions and functions of the optical interface of the RAU. An analog IF-based data signal and a digital-based auxiliary signal may be multiplexed using CWDM and connected to the MHU.

TABLE 5

| Interface | Definitions | Functions |
|---|---|---|
| Ro-IF | Optical interface for transmission of analog IF-based data signals and digital-based auxiliary signals | Optical interface receiving an analog IF-based data signal(downlink signal) transmitted from a 5G base station transmits an analog IF signal (uplink signal) transmitted from an RAU. Optical interface that connects a frequency synchronization signal digitalized through digital sampling, a TDD signal, and a DAS control and management signal |

A process of testing the DAS structure may be described below.

Initial characterization and qualification may be performed on the DAS structure. Qualification maintenance may be performed periodically using a test program. A test condition for all tests may be 25° C.±2° C.(i) Performance test The performance test may be performed when the characterization test is completed. A plan for the performance test and a recommended failure criterion for the performance test will be described below. Environment specification (i) Laser Safety An optical fiber transmitter and transceiver using a laser diode may need to be certified as Laser Class 1-3R under all operating conditions. This may include a single fault condition related to coupling to an optical cable or to an open hole. The optical fiber transmitter and transceiver using the laser diode described herein may need to be certified to comply with IEC 60825-1.(ii) Temperature and environment Measurements may be performed indoors at a temperature from 5° C. to 35° C. When an operating temperature range of a measuring device is narrower than the above range, specifications of the measuring device may need to be followed. The measurement temperature may be controlled to be desirably within ±5° C. to minimize an effect of temperature drift on the measuring device. A temperature of a device under test (DUT) may be changed using a temperature controller to determine the temperature dependence of a measured parameters as required.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present disclosure includes details of a plurality of specific example embodiments, the details should not be construed as limiting any invention or a scope that can be claimed, but rather should be construed as being descriptions of features that may be peculiar to specific example embodiments of specific inventions. Specific features described in the present disclosure in the context of individual example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present disclosure and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A radio-over-fiber (RoF)-based indoor distributed antenna system (DAS) for fifth generation (5G), comprising:
    a base station;
    a main hub unit connecting between the base station and a remote antenna unit, and including a processor configured to relay a mobile signal between the base station and the remote antenna unit;
    the remote antenna unit including an antenna and connecting between the main hub unit and a user terminal; and
    a distribution point connecting the main hub unit and the remote antenna unit,
    wherein the main hub unit and the remote antenna unit each include an electrical interface and an optical interface through which predetermined signals are transmitted and received between the base station and the user terminal.

2. The RoF-based indoor DAS of claim 1, wherein the remote antenna unit is configured to:
    transmit a wireless signal to the user terminal, capture a signal of the user terminal, and transmit the captured signal to the main hub unit.

3. The RoF-based indoor DAS of claim 1,
    having a point-to-point structure in which the main hub unit is directly connected to a single remote antenna unit without the distribution point; and
    having a point-to-multipoint structure in which the main hub unit and multiple remote antenna units are connected through the distribution point.

4. The RoF-based indoor DAS of claim 1, wherein the electrical interface of the main hub unit comprises:
    (i) an electrical interface for 5G signals in an intermediate frequency (IF) band, which is an electrical input/output interface that receives an analog IF-based downlink 5G signal from a 5G base station and transmits an analog IF-based uplink 5G signal from a remote antenna unit to the 5G base station;
    (ii) an electrical interface for frequency synchronization signals, receiving a frequency synchronization signal or propagating the signal toward a remote antenna unit from a 5G base station or a global positioning system (GPS) clock receiver;
    (iii) an electrical interface for time-division duplexing (TDD) synchronization signals, receiving a TDD signal or propagating the signal toward a remote antenna unit from a 5G base station; and
    (iv) an electrical interface for system control and management signals, which is an electrical input/output interface for control and management signals used to monitor, manage, and control a main hub unit and multiple remote antenna units connected to the main hub unit.

5. The RoF-based indoor DAS of claim 1, wherein the electrical interface of the remote antenna unit comprises:
    (i) an electrical interface for 5G signals in a radio frequency (RF) millimeter wave (mmWave) band, which is an electrical input/output interface of a remote antenna unit for transmitting a 5G TDD synchronization signal in the RF or mmWave band through an antenna to a subscriber terminal or transmit the signal in a reverse direction; and
    (ii) an electrical interface for system control and management signals, which is an electrical input/output interface for control and management signals used to monitor, manage, and control a remote antenna unit.

6. The RoF-based indoor DAS of claim 1, wherein the optical interface of the main hub unit comprises:
    an optical interface for transmitting an analog IF-based data signal and a digital-based auxiliary signal, which is an optical interface that connects a frequency synchronization signal digitalized through digital sampling, a TDD signal, and a DAS control and management signal.

7. The RoF-based indoor DAS of claim 1, wherein the optical interface of the remote antenna unit comprises:
    an optical interface for receiving an analog IF-based data signal and a digital-based auxiliary signal, which is an optical interface that connects a frequency synchronization signal digitalized through digital sampling, a TDD signal, and a DAS control and management signal.

8. The RoF-based indoor DAS of claim 1, further comprising:
    a test device comprising:
        at least one processor; and memory having instructions stored thereon, which, when executed by the at least one processor, cause the at least one processor to authenticate laser stability for the DAS at a limited temperature.

* * * * *